May 18, 1926.
T. H. WRIGHT
TIRE
Filed July 1, 1925
1,585,068
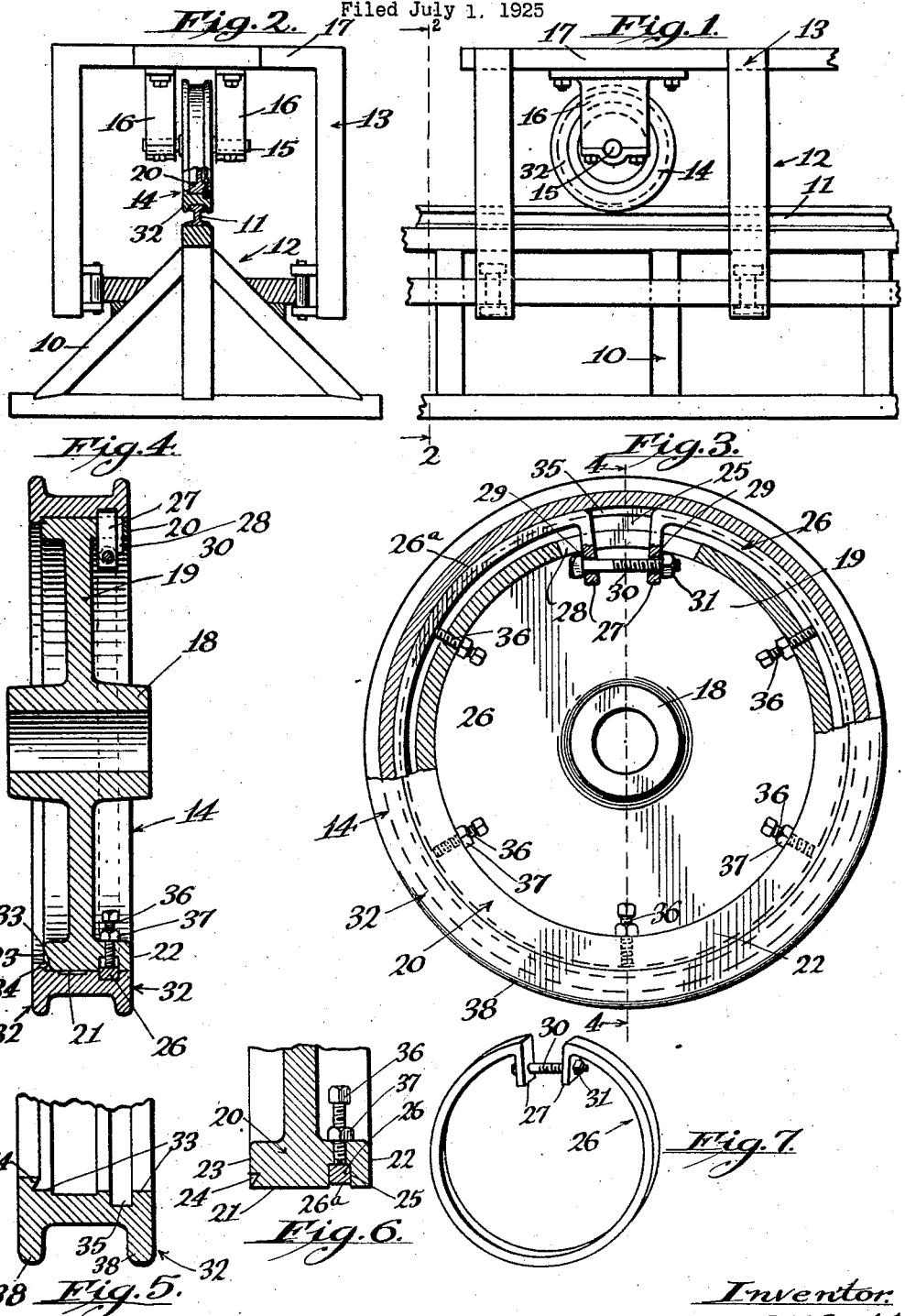
Inventor
Thomas H. Wright
BY Harper and Miller
Attorneys Patented May 18, 1926.

1,585,068

UNITED STATES PATENT OFFICE.

THOMAS H. WRIGHT, OF LOS ANGELES, CALIFORNIA.

TIRE.

Application filed July 1, 1925. Serial No. 40,856.

This invention relates to car wheels having removable tires.

The object of this invention is to provide a car wheel having a removable tire which may be quickly applied or removed.

Another object of the invention is to provide in a car wheel having a removable tire means for holding the tire firmly in place thereon.

A further object of this invention is to provide a wheel construction which is particularly adapted to be used on monorail cars and engines and other structures where it is difficult to remove the wheels without dismantling a considerable part of the structure of the car or engine.

These objects are accomplished by the disclosure herein set forth by the following description of the accompanying drawings, illustrating a practical embodiment of the invention, in which:—

Figure 1 is a side elevation of a monorail construction showing the improved wheel mounted on a track and supporting the car, Fig. 2 is a transverse section taken on the line 2—2 of Fig. 1, Fig. 3 is a side elevation of the improved wheel, the parts being broken away and shown in section, Fig. 4 is a section taken on the line 4—4 of Fig. 3, Fig. 5 is a fragmentary section of the tire of the improved wheel, Fig. 6 is a fragmentary section through the web and felly showing the retaining means in place thereon before the tire is applied thereto, and Fig. 7 is a perspective view of a split ring used in retaining the tire upon the wheel.

Referring by numerals to the accompanying drawings, particularly to Figs. 1 and 2, 10 designates a frame-work adapted to support a single rail 11 of a monorail construction, generally designated at 12, comprising a car 13 which is carried on the rail 11 by two or more wheels constituting the invention and generally designated at 14, which are mounted on axles 15 carried by journals secured to the body 17 of the car 13.

The improved wheel has a hub 18, web 19 and a felly 20. The felly 20 has a straight peripheral face 21 and flat side faces 22 and 23. An annular V-shaped groove 24 is formed in the face 23 and an annular recess 25 is formed in the face 21 of the felly 20 which is adapted to receive a split ring formed of spring metal and substantially square-shaped in cross section, designated at 26. The ring 26 has inwardly turned lugs 27 extending through a slot 28 formed in the felly 20 and communicating with the groove 24. Each of the lugs 27 has an opening 29 in its lower end, through which extends a bolt 30 having a nut 31 and is provided for a purpose hereinafter described.

A removable tire, generally designated at 32, has an internal surface 33 which is adapted to engage the peripheral face 21 of the felly 20, and has a lateral annular lug 34 adapted to engage the groove 24 and also has an annular recess 35 of the same shape as the recess 25.

In assembling, assuming the wheel is in a vertical position, the ring 26 is first placed in the recess 25 by inserting the lugs in the slot 28, and then moving it downwardly on an angle. The ring is then pressed inwardly and it will drop into the recess 25 when in register therewith. The bolt 30 is then placed in the openings 29 in the lugs 27 and the nut 31 turned to contract the ring so that its outer face 26ª will be slightly below the surface or face 21 of the felly, as shown in Fig. 6. The tire 32 is then placed on the felly 20 and a plurality of set screws 36 having lock nuts 37, radially mounted in one side of the felly, are turned to expand the ring 26. When the ring is fully expanded, that is, when its outer face engages the inner face of the recess 35 in the tire, a portion of the ring will still be in the recess 25 in the felly, as clearly shown in Figs. 3 and 4. Hence when the ring is expanded, the tire will be firmly held in place upon the felly. It will be obvious that the tire may be removed by reversal of the above operations.

The tire may be provided with oppositely disposed flanges 38 when used upon a monorail system or may have a single flange if the improved wheel is used on cars of the ordinary double rail system.

It will be understood that various changes in the detail of construction may be made without departing from the spirit or scope of the invention as defined by the appended claims.

I claim:

1. In a car wheel, a removable tire having an internal annular recess formed therein adapted to register with an annular recess formed in the felly of the wheel, a split ring formed of spring metal adapted to fit within the recess formed in said felly, and a plurality of set screws carried by the felly adapted to expand said split ring into the internal annular recess formed in said removable tire, said split ring being adapted to hold said tire from lateral movement on the felly by a portion of said split ring remaining in the internal annular recess in the felly when said set screws are tightened.

2. In a car wheel, a removable tire having an internal annular lug on one side thereof adapted to engage an annular groove formed in the face of the felly of the wheel, there being an internal annular recess formed in said removable tire adapted to register with an annular recess formed in the face of said felly, a split ring formed of spring metal adapted to fit within the recess in said felly, and a plurality of set screws carried by said felly adapted to expand said split ring into engagement with the internal annular recess formed in said removable tire.

3. In a car wheel, a removable tire having an internal annular recess formed therein, adapted to register with an annular recess formed in the felly of the wheel, a split ring formed of spring metal and substantially square-shaped in cross section adapted to fit within the recess formed in said felly, and a plurality of radially mounted set screws carried by the felly adapted to expand said split ring into the internal annular recess formed in said removable tire, said split ring being adapted to hold said tire from lateral movement on the felly by a portion of said split ring remaining in the internal recess in the felly when said set screws are tightened.

4. In a car wheel, a removable tire having an internal annular recess formed therein adapted to register with an annular recess formed in the face of the felly, a split ring formed of spring metal and having inwardly turned lugs adapted to extend into a slot in said felly, a plurality of set screws mounted in the felly adapted to expand said split ring into the internal annular recess formed in said tire, and means for contracting said split ring.

5. In a car wheel, a removable tire having an internal annular recess formed therein adapted to register with an annular recess formed in the face of the felly, a split ring formed of spring metal and having inwardly turned lugs adapted to extend into a slot in said felly, a plurality of set screws mounted in the felly adapted to expand said split ring into the internal annular recess formed in said tire, and a bolt having a nut extending through openings formed in the lugs of said rings for contracting said split ring.

In testimony whereof I have signed my name to this specification.

THOMAS H. WRIGHT.